Figure 2:
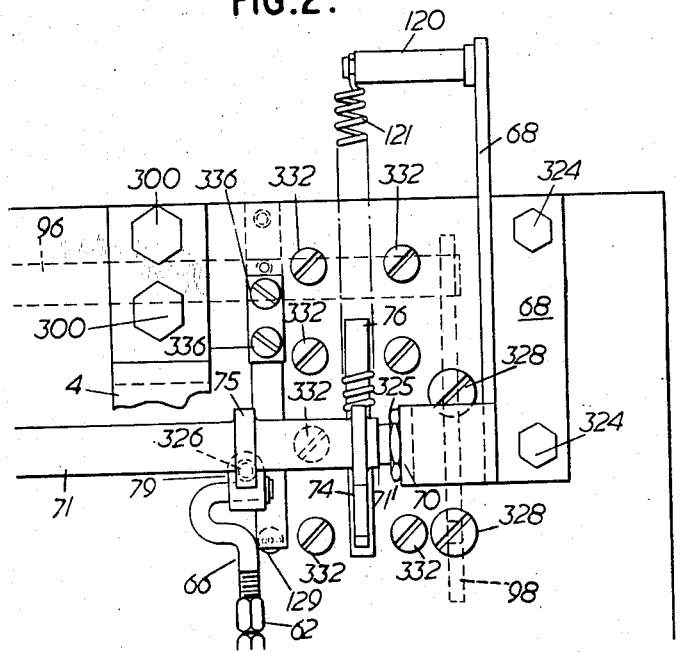

Dec. 18, 1962
G. X. LENS ET AL
3,068,988
MECHANISM FOR TRANSFERRING FLAT ARTICLES
FROM A TRANSVERSE CONVEYOR
TO AN EDGEWISE CONVEYOR
Filed April 14, 1959
20 Sheets-Sheet 1
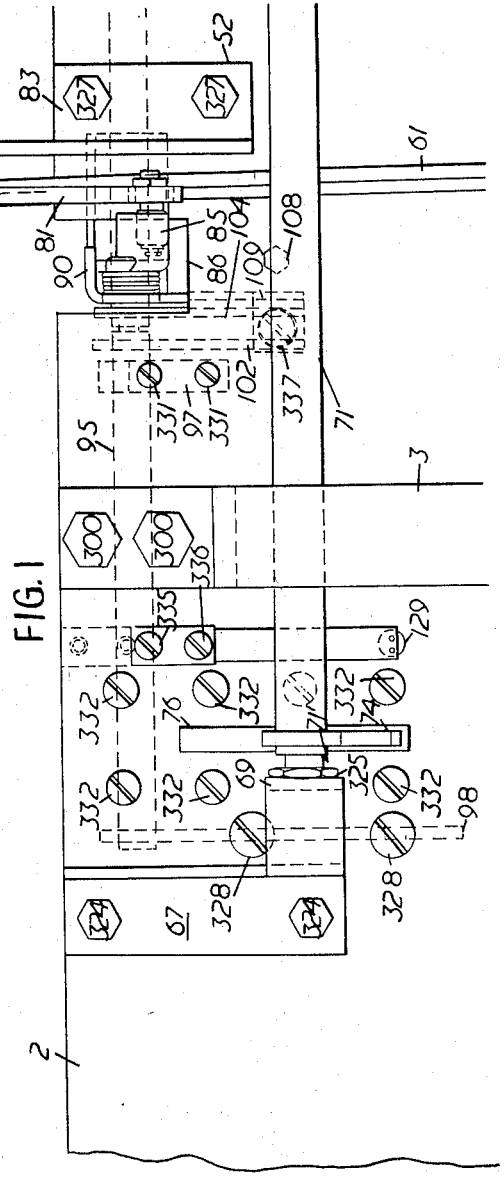
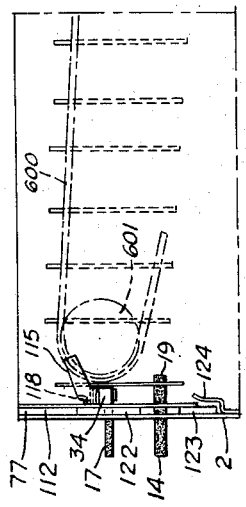
*Inventor*
G.X.LENS-J.B.DE PEUTER
By Robert Harding Jr.
/*Attorney*

Inventor
G.X. LENS-J.B. DE PEUTER

Dec. 18, 1962  G. X. LENS ET AL  3,068,988
MECHANISM FOR TRANSFERRING FLAT ARTICLES
FROM A TRANSVERSE CONVEYOR
TO AN EDGEWISE CONVEYOR
Filed April 14, 1959   20 Sheets-Sheet 7

Inventor
G.X.LENS-J.B.DE PEUTER

By Robert F. Harding
Attorney

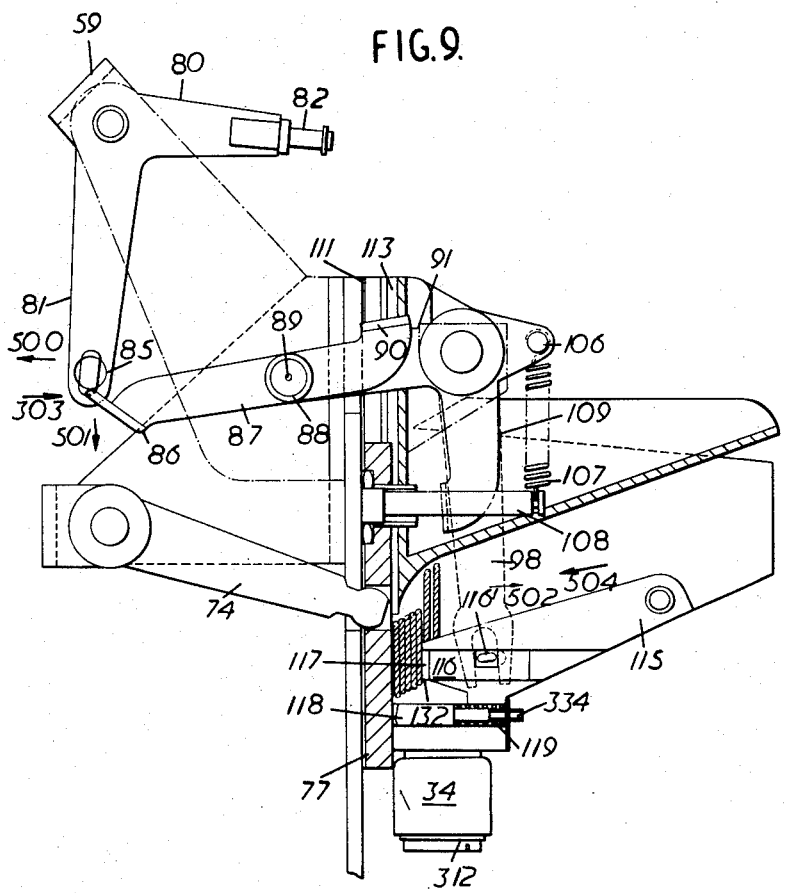

Dec. 18, 1962 G. X. LENS ET AL 3,068,988
MECHANISM FOR TRANSFERRING FLAT ARTICLES
FROM A TRANSVERSE CONVEYOR
TO AN EDGEWISE CONVEYOR
Filed April 14, 1959 20 Sheets-Sheet 9

*Inventor*
G.X.LENS-J.B.DE PEUTER

By Robert Harding Jr.
*Attorney*

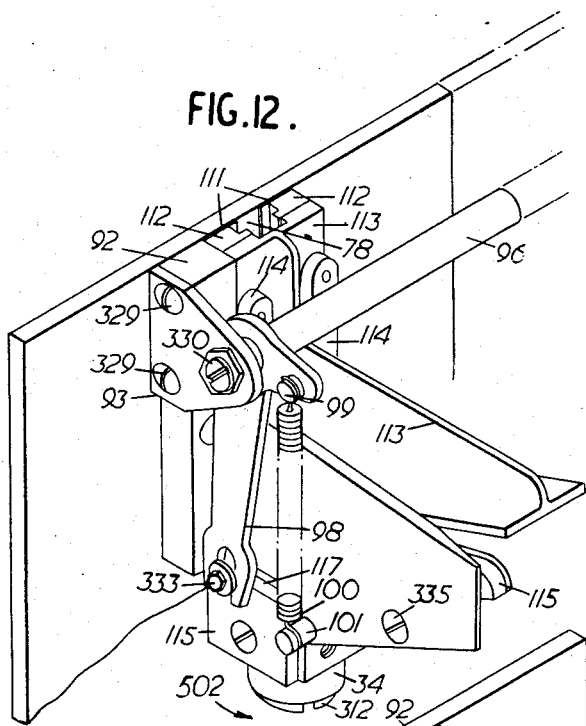
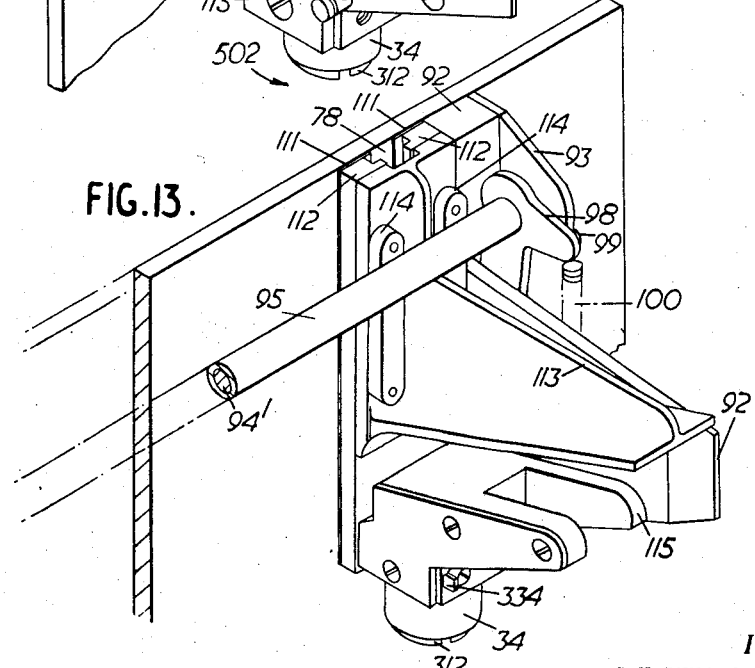

Dec. 18, 1962 G. X. LENS ET AL 3,068,988
MECHANISM FOR TRANSFERRING FLAT ARTICLES
FROM A TRANSVERSE CONVEYOR
TO AN EDGEWISE CONVEYOR
Filed April 14, 1959 20 Sheets-Sheet 13

Inventor
G.X. LENS-J.B. DE PEUTER
By Robert Harding Jr.
Attorney

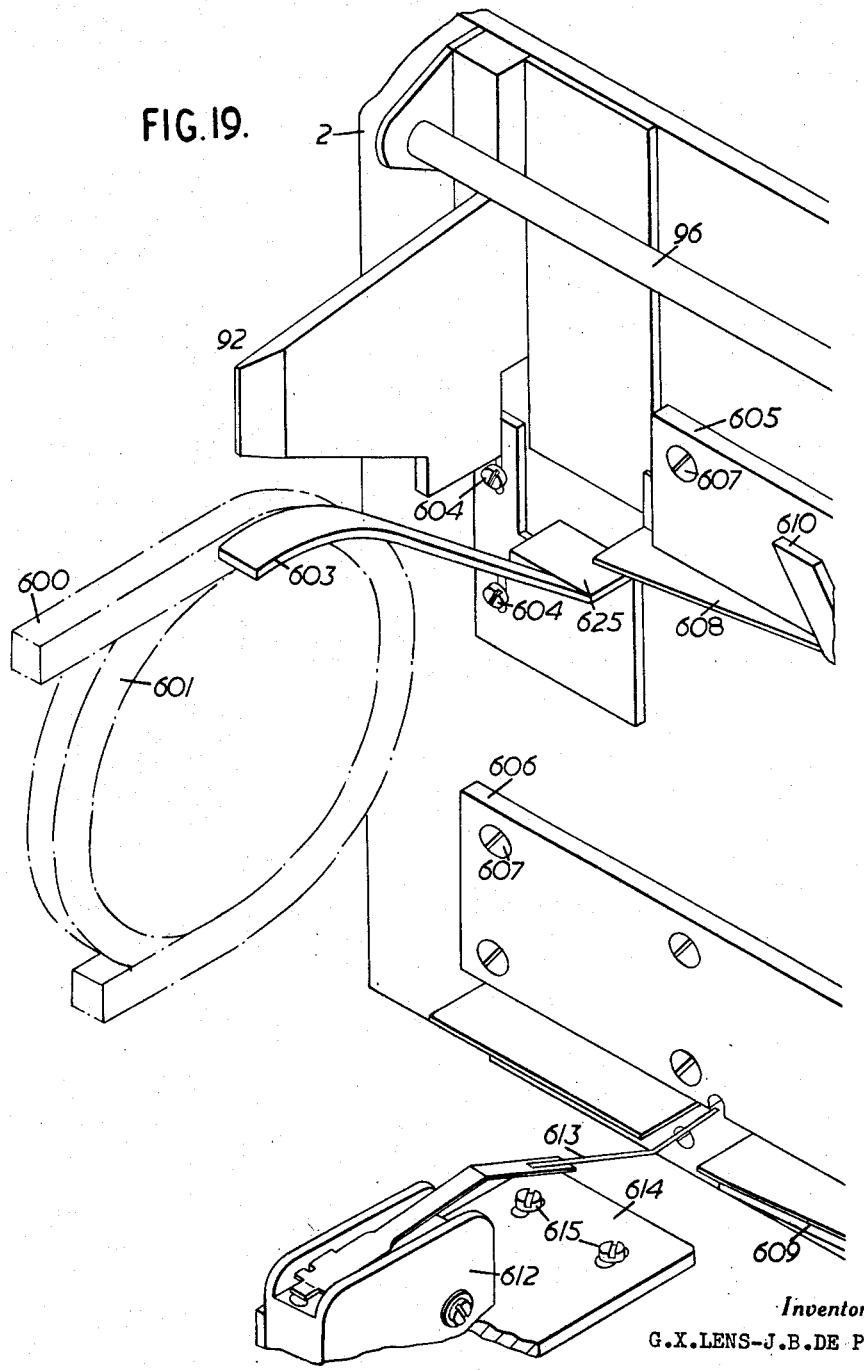

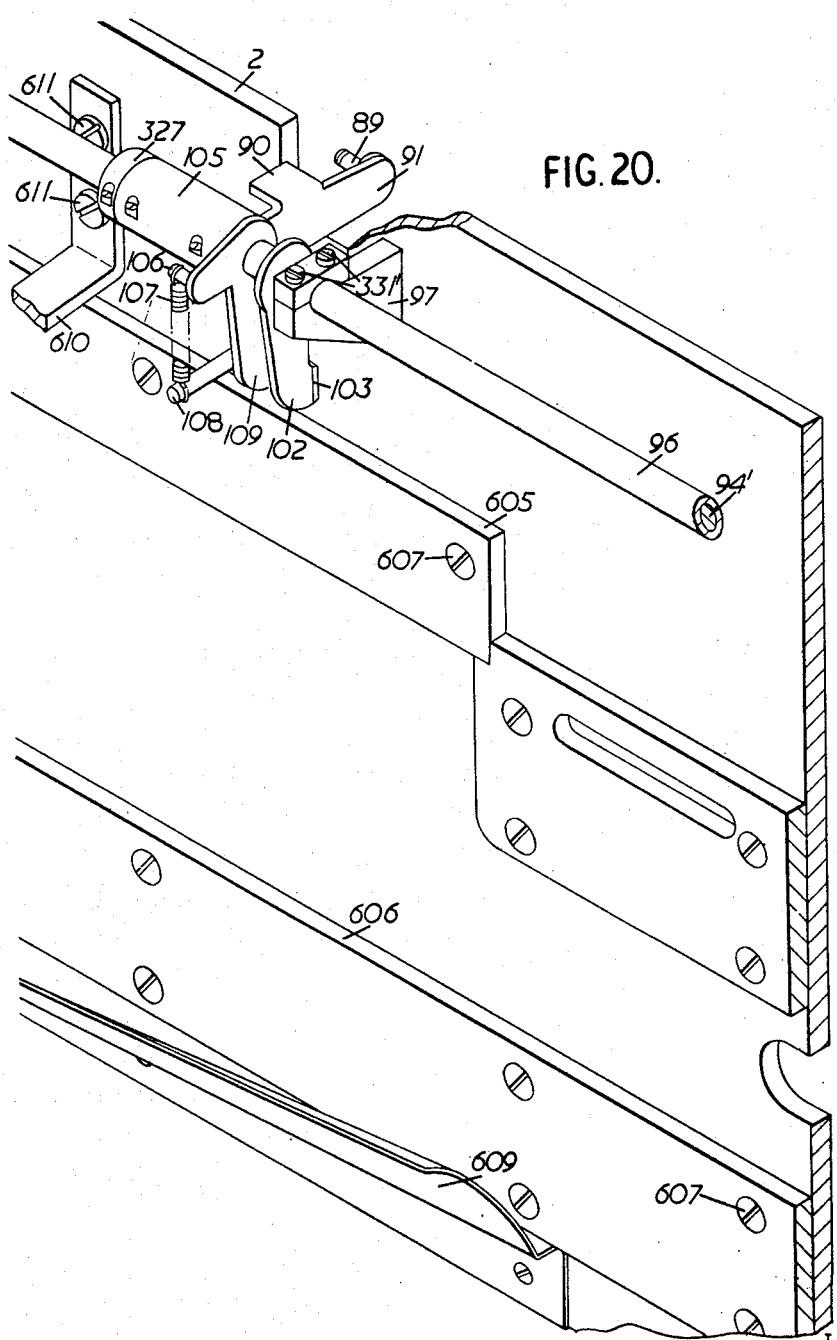

Dec. 18, 1962    G. X. LENS ET AL    3,068,988
MECHANISM FOR TRANSFERRING FLAT ARTICLES
FROM A TRANSVERSE CONVEYOR
TO AN EDGEWISE CONVEYOR
Filed April 14, 1959    20 Sheets-Sheet 16
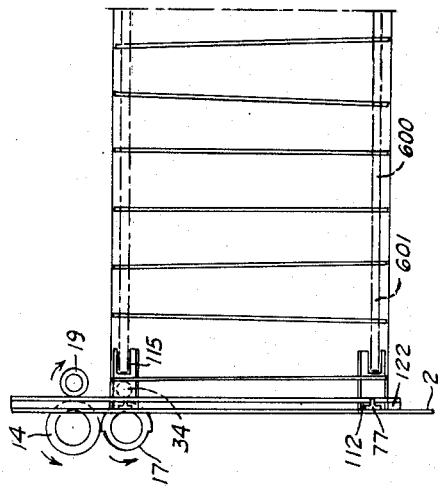
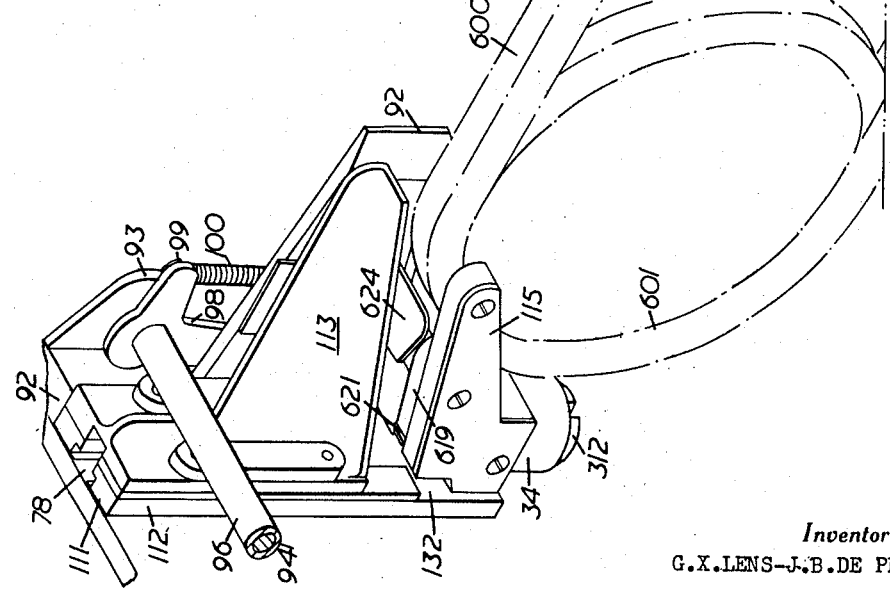
Inventor
G.X. LENS-J.B. DE PEUTER
By
Attorney Dec. 18, 1962

G. X. LENS ET AL 3,068,988

MECHANISM FOR TRANSFERRING FLAT ARTICLES
FROM A TRANSVERSE CONVEYOR
TO AN EDGEWISE CONVEYOR

Filed April 14, 1959

20 Sheets-Sheet 18

*Inventor*
G.X.LENS—J.B.DE PEUTER

By *Robert Harding Jr*
*Attorney*

Dec. 18, 1962  G. X. LENS ET AL  3,068,988
MECHANISM FOR TRANSFERRING FLAT ARTICLES
FROM A TRANSVERSE CONVEYOR
TO AN EDGEWISE CONVEYOR
Filed April 14, 1959  20 Sheets-Sheet 19

Inventor
G.X.LENS-J.B.DE PEUTER

By *Robert Hardesty J.*
Attorney

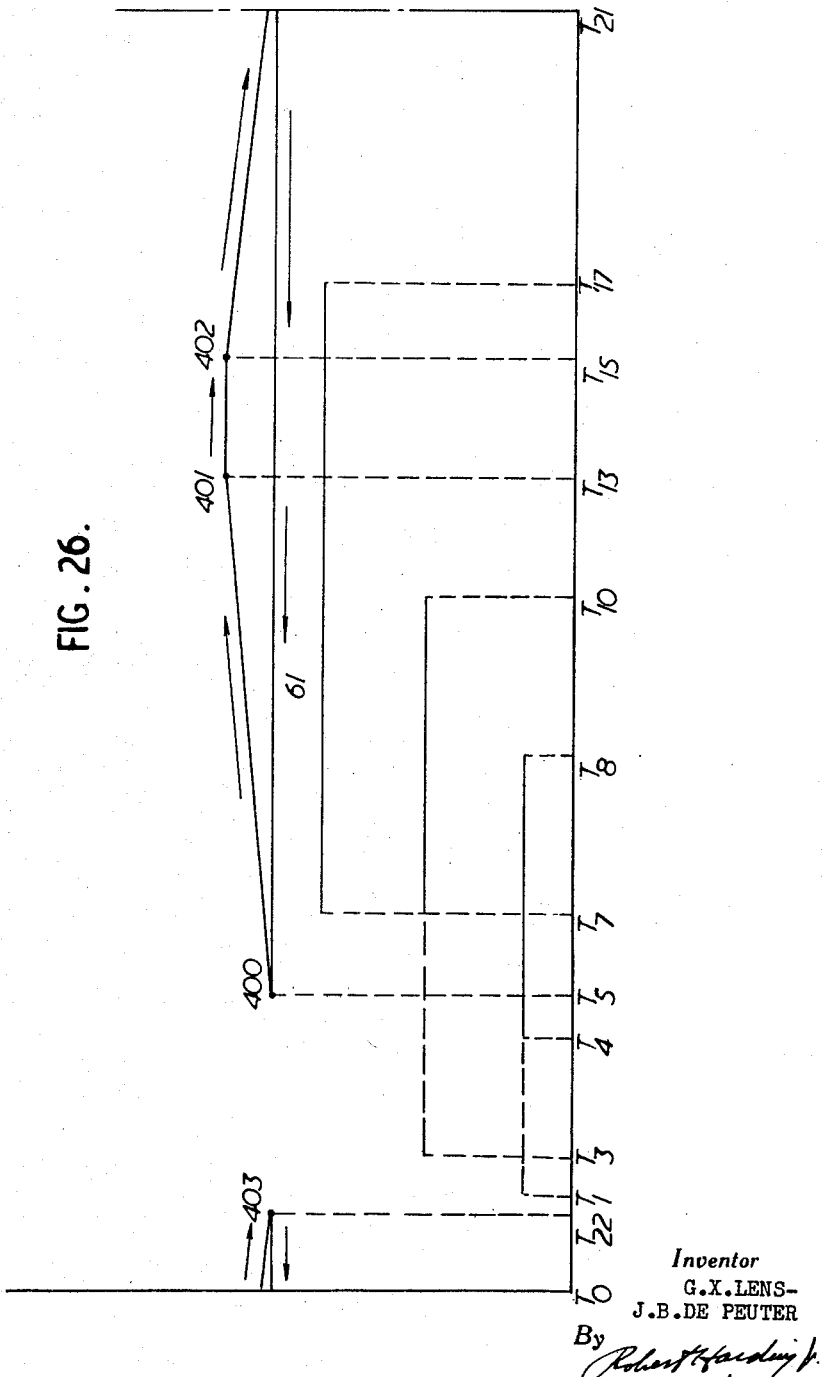

United States Patent Office 3,068,988
Patented Dec. 18, 1962

3,068,988
MECHANISM FOR TRANSFERRING FLAT ARTICLES FROM A TRANSVERSE CONVEYOR TO AN EDGEWISE CONVEYOR
Georges Xavier Lens and Jan Baptiste De Peuter, Antwerp, Belgium, assignors to International Standard Electric Corporation, New York, N.Y., a corporation of Delaware
Filed Apr. 14, 1959, Ser. No. 806,286
5 Claims. (Cl. 198—26)

The invention relates to a mechanism for transferring flat articles from a transverse conveyor to an edgewise conveyor and more particularly to a mechanism adapted to the high speed transfer of said articles to an edgewise conveyor, situated somewhat below said transverse conveyor.

The articles to be transferred by the disclosed mechanism are of the type described in Belgian Patent No. 544,840. These articles may be document carriers or the documents themselves. The only restrictions on such articles are that they must be substantially flat and have a lateral extension from either end so that they may be suspended thereby in a substantially vertical plane.

A sorting machine has been disclosed in the Belgian Patent No. 544,839 in which the transfer of flat articles, of the type described, from a transverse conveyor to an edgewise conveyor which is located substantially above said transverse conveyor, is executed by a lifting arrangement. A lifting movement for the articles implies however that they have to move upward by a distance at least equal to their height so that they can project through the bottom surface of the edge-wise conveyor table on which they will afterwards be guided. A uni-directional gating mechanism has to be provided so that the article can project through the table but is unable to fall back afterwards. This relatively large ascending displacement necessitates very careful design of the mechanism, but even then the time required for the upward motion will be relatively large and it will be difficult to conciliate it with the needs of a high speed article processing machine.

The general object of the invention is to realize an improved mechanism adapted to the high speed transfer of flat articles from a transverse to an edgewise conveyor.

A more precise object of the invention is to realize such a mechanism which provides only for limited vertical displacement of the articles in a downward direction.

In accordance with a characteristic of the invention, a mechanism for transferring flat articles from a transverse conveyor to an edgewise conveyor in which said transverse conveyor advances continuously to press a stack of said articles towards a front plate, said mechanism being adapted to seize and displace said front article against said plate until it reaches a position such that its lower edge rests on a flat surface along which it will be displaced by said edgewise conveyor, is characterised by the fact that said mechanism includes means for vertically displacing reciprocating parts sliding in said front plate and protruding slightly out of the latter, said reciprocating parts having a thickness greater than that of the fixed part of the plate by an amount corresponding to the thickness of said articles, so as to raise them above said front article, thereby allowing the latter to be pressed against said fixed part, whereafter said means bring down said reciprocating parts on the upper edge of said article to cause it to be displaced downward.

Figure 8:
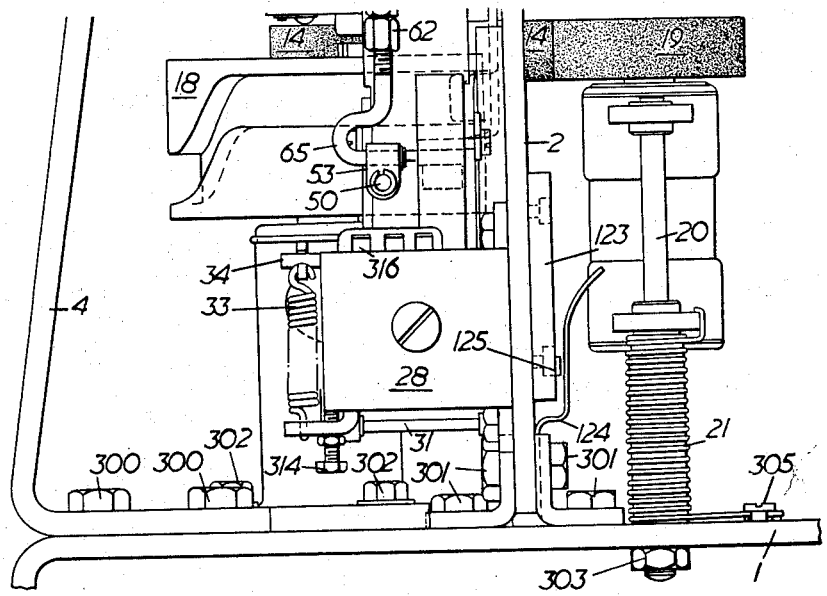
Figure 5:
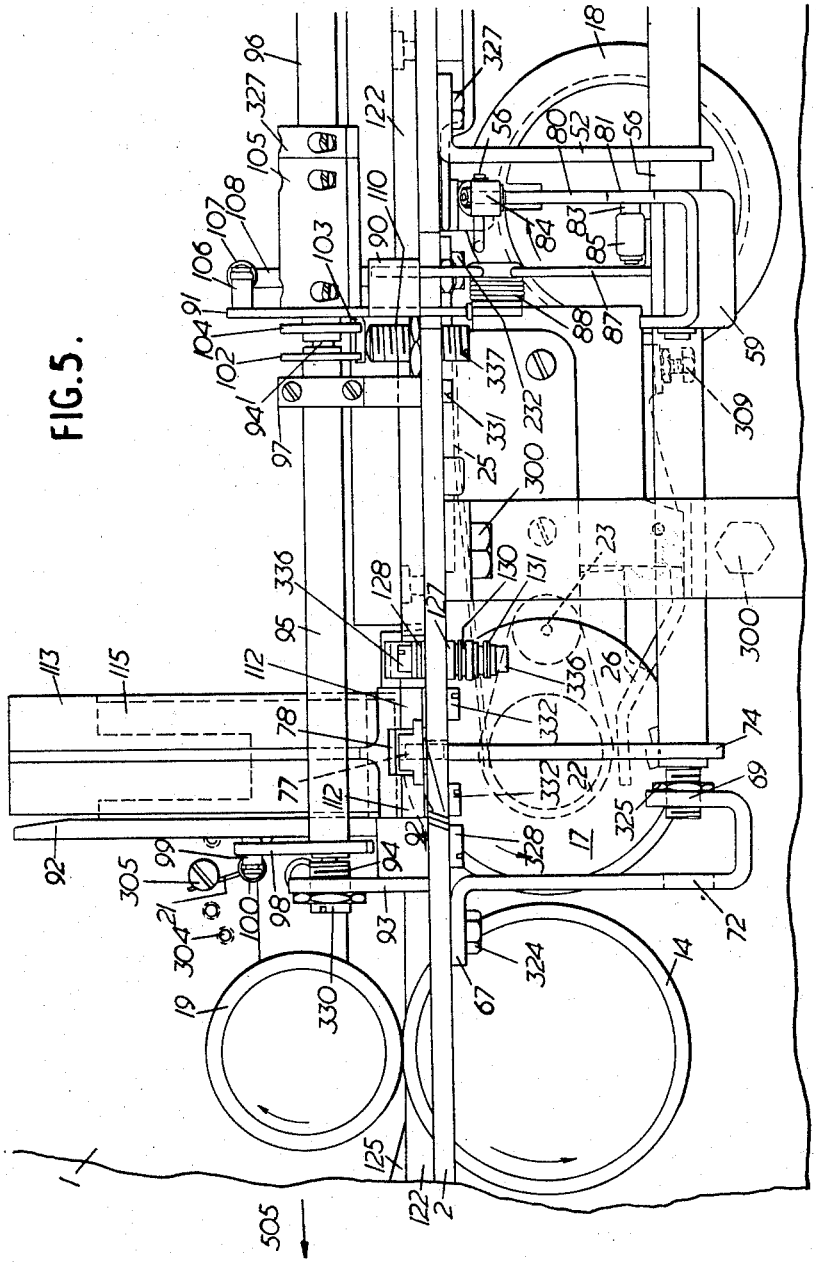
Figure 6:
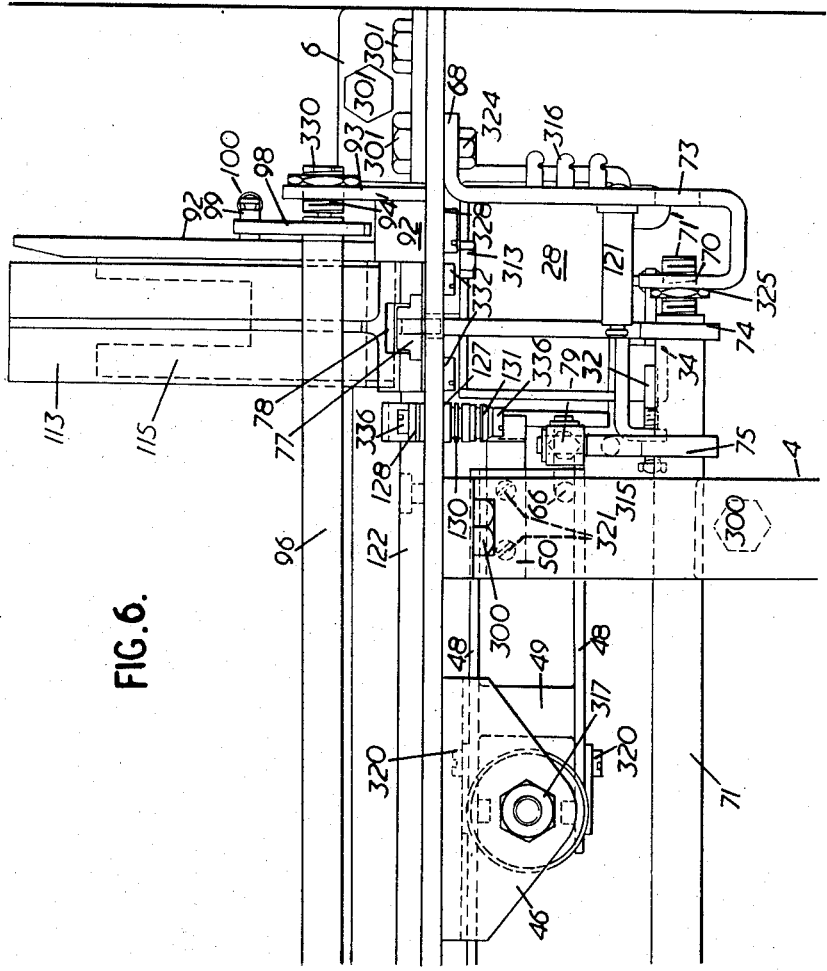
Figure 7:
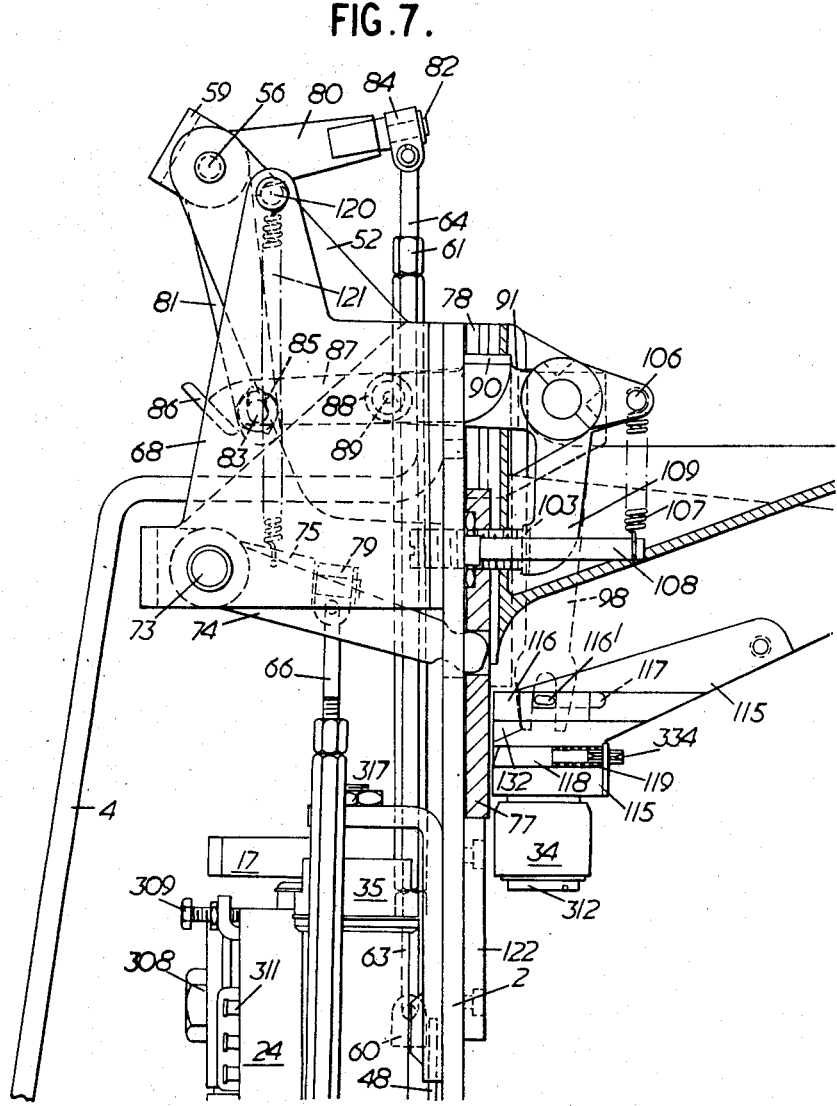
Figure 10:
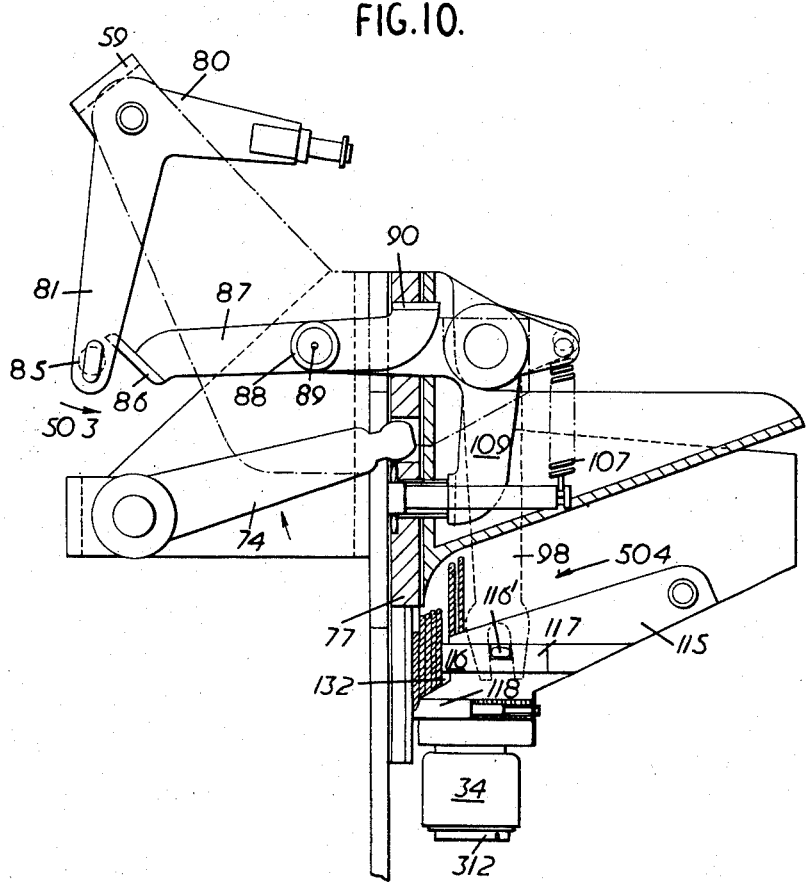
Figure 11:
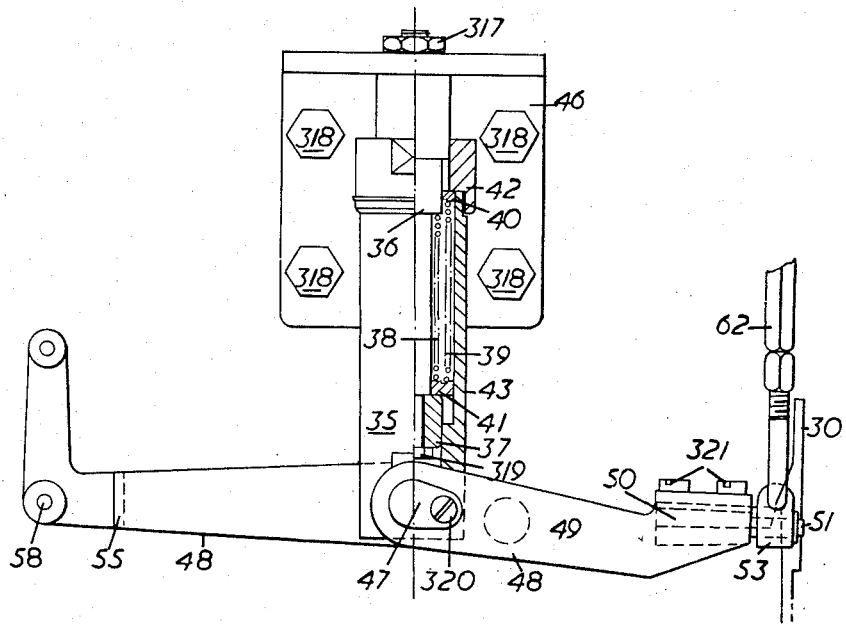
Figure 11A:
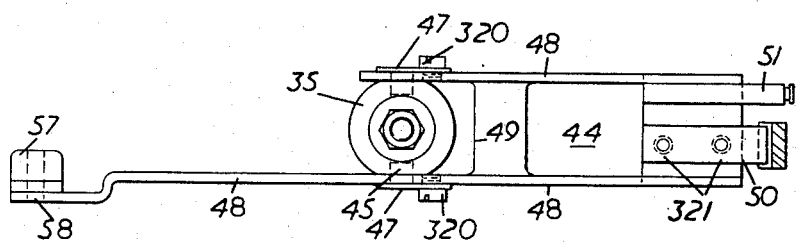
Figure 14:
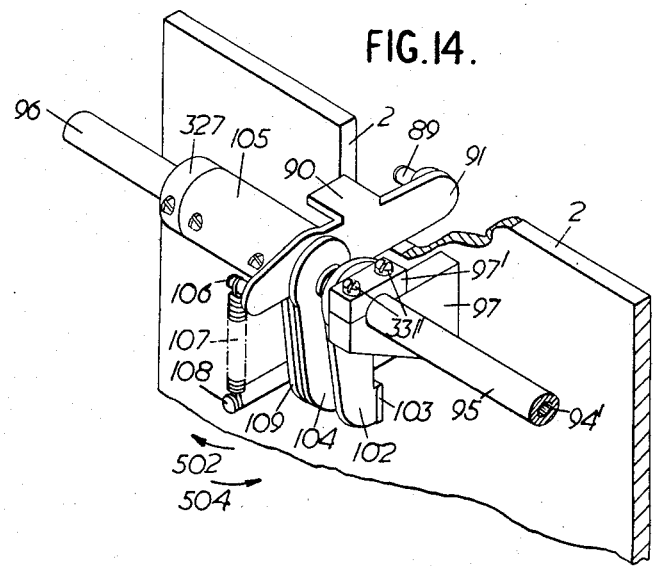
Figure 15:
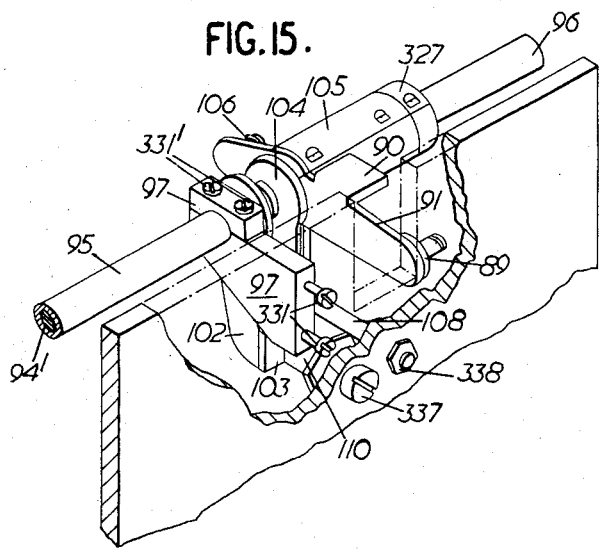
Figure 16:
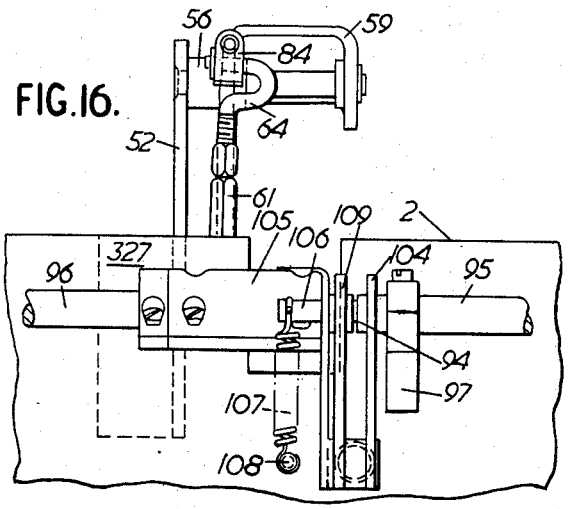
Figure 17:
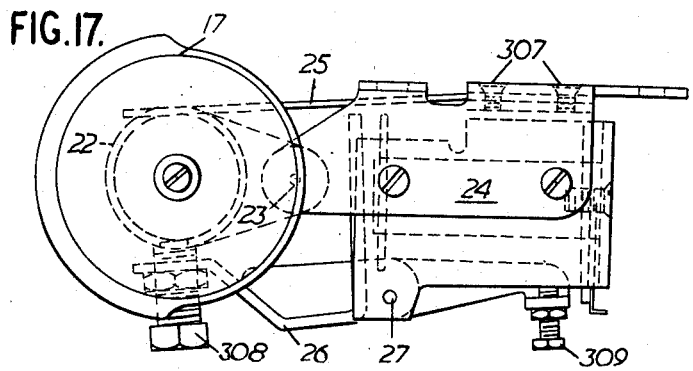
Figure 18:
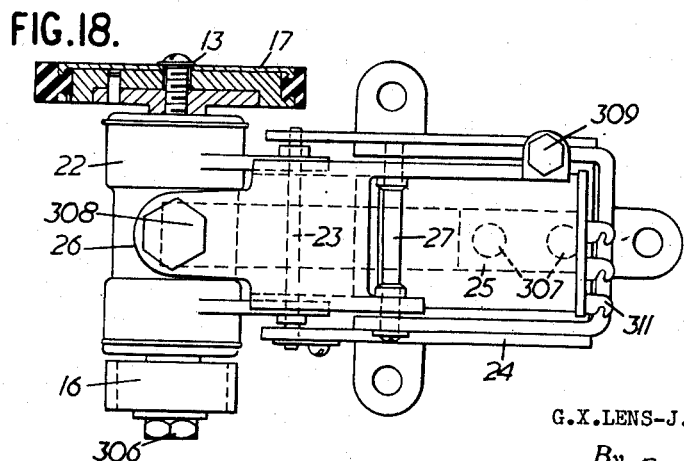
Figure 22:
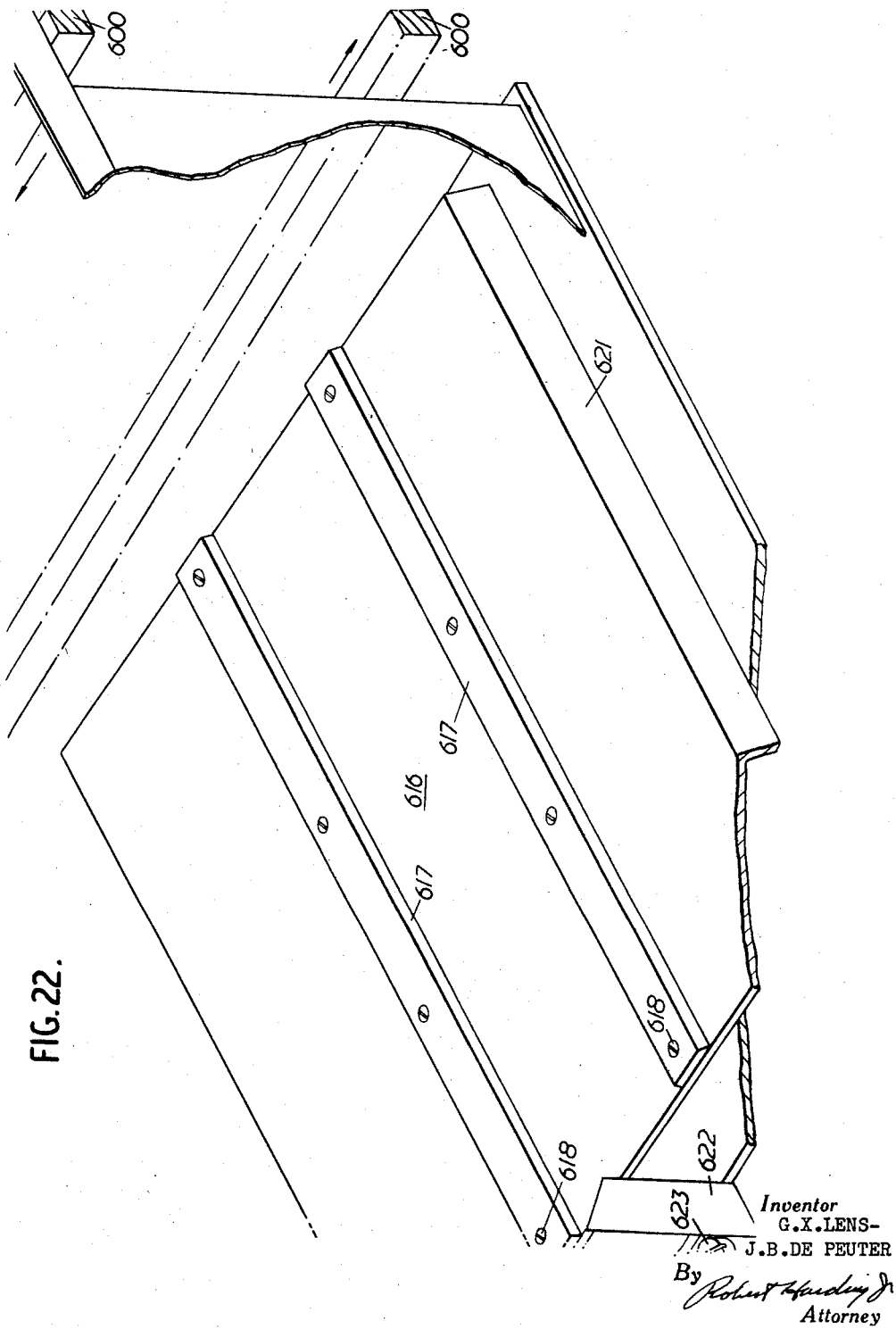
Figure 23:
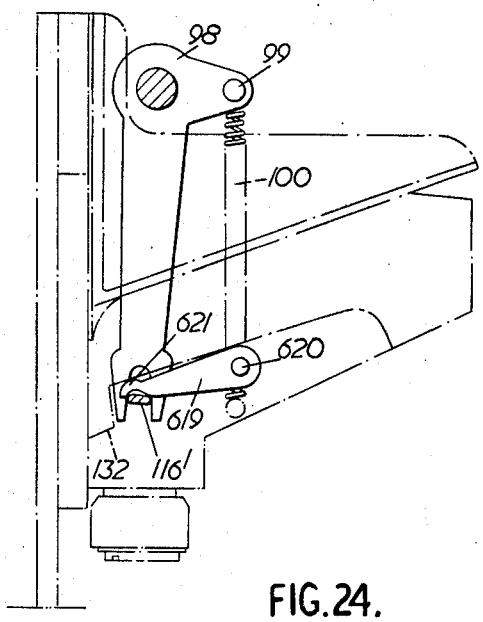
Figure 24:
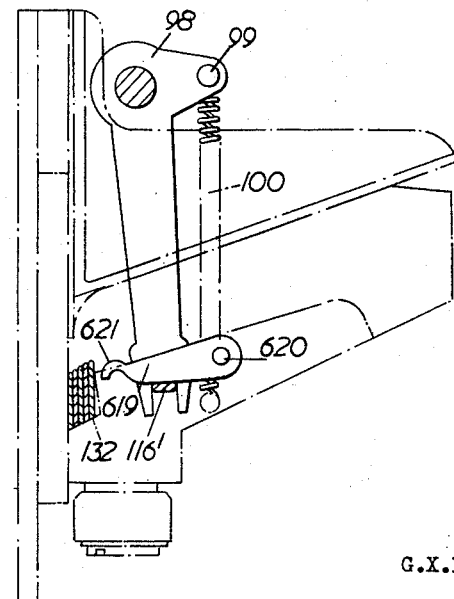
Figure 25:
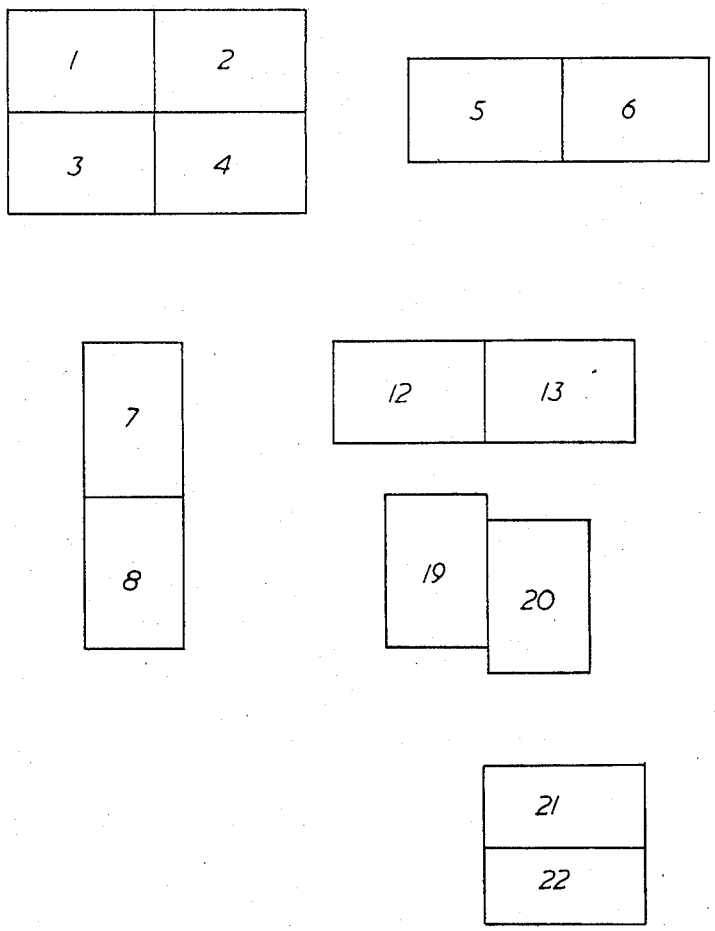

The above mentioned and other features and objects of this invention and the best manner of attaining them will become more apparent and the invention itself will be best understood, by reference to the following description of an embodiment of the invention taken in conjunction with the accompanying drawings, wherein:

FIGS. 1, 2, 3 and 4, assembled as shown in FIG. 25 represent a rear view of a first embodiment of the mechanism;
FIG. 1A represents a schematic plan view of the overall system showing the articles in their various positions during operation.
FIG. 1B is a schematic side view of FIG. 1A showing the articles in their successive positions during operation of the system.
FIGS. 5 and 6, when assembled as shown on FIG. 25, constitute a plan view of the mechanism;
FIGS. 7 and 8 when assembled as shown on FIG. 25 represent a left-hand side view of the mechanism wherein the upper left-hand part (FIG. 2) of the vertical plate has not been represented.
FIGS. 9 and 10 show views similar to that of FIG. 7 in which the mechanisms occupy various positions;
FIG. 11 represents a detailed view of a spring arrangement part of the mechanism;
FIG. 11A is a plan view of the spring arrangement part of the mechanism of FIG. 11.
FIGS. 12 and 13, assembled as shown on FIG. 25 constitute a perspective front view of the mechanism;
FIGS. 14 and 15 constitute detailed perspective views of a part of the mechanism shown in FIG. 7;
FIG. 16 constitutes a front view of the part shown in FIGS. 14 and 15;
FIGS. 17 and 18 represent detailed views of shifting means part of the edgewise conveyor;
FIGS. 19 and 20 assembled as shown on FIG. 25 represent a perspective front view of the left upper part of a modified embodiment of the invention;
FIGS. 21 and 22 assembled as shown on FIG. 25 constitute a perspective front view of the right upper part of this modified embodiment, together with the bottom part;
FIGS. 23 and 24 constitute a side view of a mechanism of the modified embodiment in the unoperated and operated position respectively;
FIG. 25 shows how some of the foregoing figures have to be assembled;
FIG. 26 constitutes a timing chart of an operation cycle.

Before describing the transfer mechanism, object of the present invention, it should be noted that it is generally applicable to machines wherein a transfer of documents or document carriers, of the type previously referred to, from a transverse to an edgewise conveyor is required, e.g. a sorting machine of the type disclosed in our Belgian Patent No. 577,753, or document processing machines such as disclosed in our Belgian Patents Nos. 577,761 and 577,767.

The flat articles processed in the present invention are of the above mentioned type while the edgewise conveyor which is cooperating with the present transfer mechanism is of the type described in more detail in our Belgian Patent No. 577,760.

Referring to FIGS. 1A and 1B, the articles to be transferred from the transverse conveyor to an edgewise conveyor are shown in their various positions in the mechanism. The articles are suspended by lateral shoulders on the chains 600 of the transverse conveyor. As each article reaches the top of the inclined conveyor its shoulders slide along the guides 115 until they drop into position with their front face against reciprocating member 77. An operating cycle is then initiated which causes the reciprocating member or reciprocating parts to be raised, so that the article shoulders drop into a second position created by the raising of the reciprocating parts. On the downward stroke of the operating cycle, a portion of the reciprocating parts engage the top surface of the shoulder of the foremost article forcing it downward until its bottom rests on the edgewise conveyor. This edgewise conveyor immediately conveys the article towards its next station, freeing the entrance to the edgewise conveyor for the next article.

Referring principally to FIGS. 1 to 8, the different parts of the transfer mechanism are fixed on horizontal and vertical mounting plates 1 and 2 respectively, the latter being connected to the former with brackets 3 and 4 and with L-shaped pieces 5 and 6. The former brackets 3 and 4 are fixed with nuts 300, the latter brackets 5 and 6 with nuts 301. On the horizontal plate 1 three vertical housings 7, 8, 9 are fixedly mounted by means of nuts 302 and within these housings, shafts 10, 11 and 12 respectively, can be revolved by a driving mechanism (not shown), in a direction shown on the figures and in such a manner that the angular velocity of shafts 10 and 11 is four times higher than that of shaft 12 which is directly coupled with the driving main shaft (not shown).

Wheel 14 is fixed on shaft 10 and is provided with a rubber outer periphery; it makes contact with a wheel 19 (FIG. 8) which is also provided with a rubber outer periphery, through an opening in the vertical plate 2; said wheel 19 is rotatable around axis 20, which is connected with plate 1 by nut 303 and spring 21. The tension of this spring can be regulated as the screw 305 holding its free end can be fixed in either of three openings such as 304 (FIG. 5) in plate 1. The spring tension is used to press wheel 19 against wheel 14.

Grooved cam wheel 18 which is fixed on shaft 12 possesses a profile (see FIG. 3) having two horizontal parts 401—402 and 400—404—403.

Wheel 17 (FIG 3) can be rotated together with axis 13 which is driven by shaft 11, through the medium of the identical gears 15 and 16. Its periphery has a profile as shown particularly on FIGS. 17 and 18, a rubber rim of variable thickness being provided over its surface. Wheel 17, part 22 and gear 16 (FIG. 3) which are fixed together on axis 13 with nut 306 are rotatable around axis 23, this rotation however being limited on one side by a restoring leaf spring 25 which is fixed on the frame of electromagnet 24, hereafter called shifting electromagnet, by screws 307, and on the other side by the body of bolt 308 which is fixed on the armature 26 of this electromagnet, this armature being able to pivot around axis 27 and being limited in its displacement by the body of bolt 309.

The shifting electromagnet 24 is fixed on vertical plate 2 with nuts 310 and is provided with three electrical terminals such as 311 (FIG. 3) leading to its windings. When this electromagnet is operated, the armature 26 pushes wheel 17 through an opening in the vertical plate 2 against a small wheel 34 (FIG. 7) which is fixed with the help of screw 312 on the horizontal extension of part 115. When the electromagnet 24 afterwards releases, the wheel 17 is pushed back towards its former position by said restoring leaf spring 25 until bolt 309 bumps as shown on FIG. 17, against the frame of the magnet.

Electromagnet 28 (FIGS. 4, 6 and 8) hereafter called dropping electromagnet, is secured to plate 2 by bolts 313; its armature 29 is able to pivot in a clockwise direction around axis 31, this rotation being limited by bolts 314 and 315. Leverarm 30, which is fixed on said armature, is provided with a hook extension (FIG. 11) catching the end 50 of lever 44 and preventing arm 62 from moving when electromagnet 28 is not operated since the armature arm 30 is then situated in its outermost left position.

The lever 44 and the arm 62 are pivotally linked by means of ring member 53 mounted on extension 51 (FIG. 11) of arm 44, the end of a hook 65 mounted at the bottom end of arm 62 being engaged in said ring member. Screw 315 of electromagnet 28 regulates the position of piece 32 and simultaneously the tension of the armature restoring spring 33. Said electromagnet operates by means of an impulse arriving at its electrical terminals 316 (FIG. 6) such that its armature 29 pivots around axis 31 and that arm 30 rotates clockwise towards its outermost right position, while spring 33 is stretched; when magnet 28 releases, lever arm 30 is restored to its initial position under the influence of said spring.

Part 35 (FIG. 4) is a vertical and cylindrical housing fixed with nut 317 on an L-shaped bracket 46, which is itself secured by means of nuts 318 to plate 2. A detailed view of it is given on FIG. 11. The fixed parts are a core 36, having four sections of varying thickness, and a small hollow cylinder 37 slipped over the bottom end of core 36 and fixed thereto with nut 319. The movable part is formed by a hollow cylinder 43 upon which a thick ring 42 which is able to slip on the upper thick part of core 36, is screwed. Within the space between said core 36 and said cylinder 43 two annular washers 40 and 41 are able to slip on the two intermediate sections of said core respectively. Between these washers two vertical spring coils 38 and 39 are lodged in such a manner that, as core 36 is fixed, a downward pull applied on the movable part of the cylinder 43 will compress only spring 39 while an upward push applied on said movable part may eventually compress both mentioned springs. As shown on FIG. 11 spring 39 is compressed by part 43 having reached about its lower position due to cam follower 57 being at about its lowest point. During the upward motion of part 43, spring 39 will be released. This may continue until washer 40 reaches the top section of the core 36. At this moment part 43 would start to exert an upward push on washer 41 and consequently, the upper ends of both springs 38 and 39 being fixed, both would be compressed.

Figure 3:
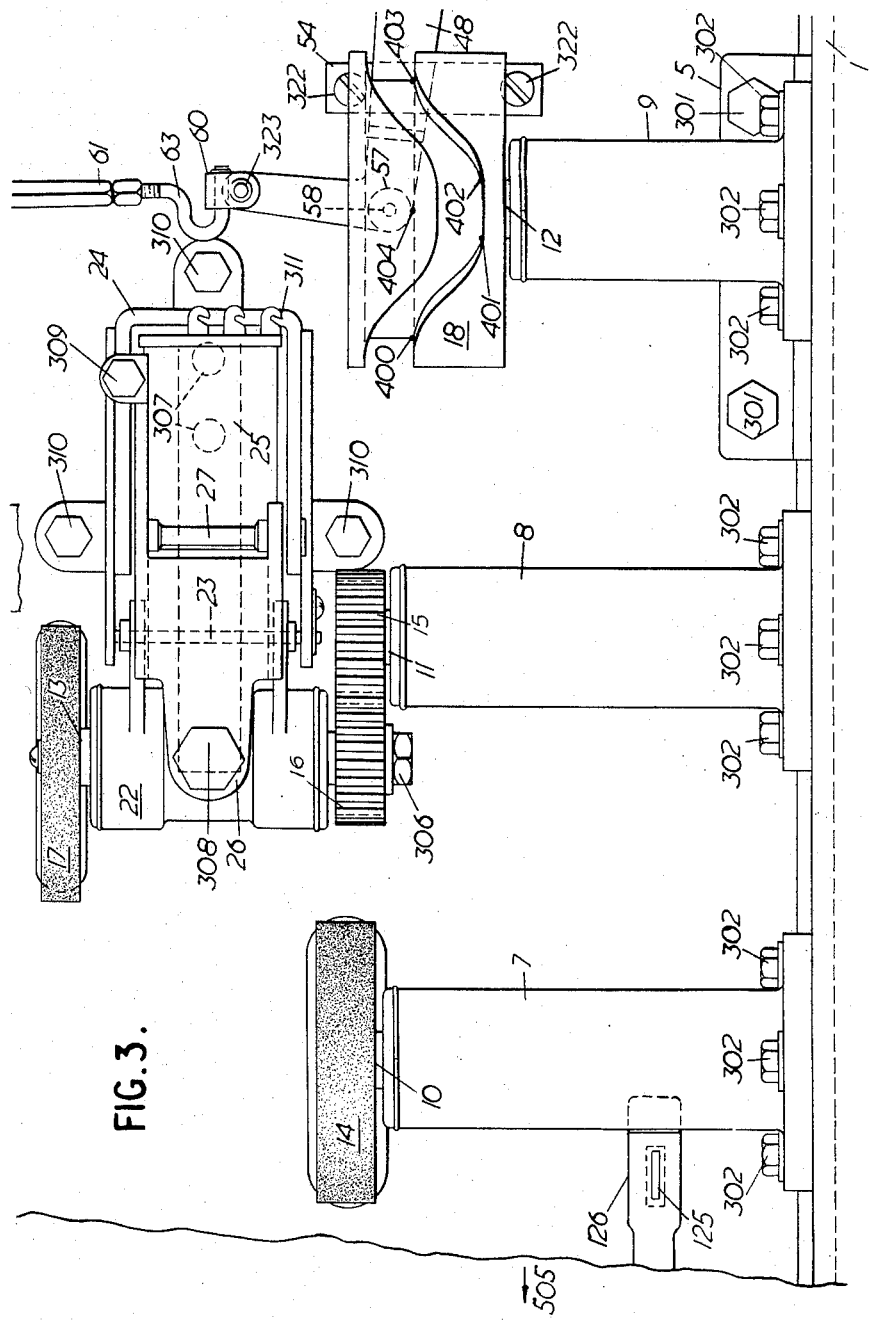
Figure 4:
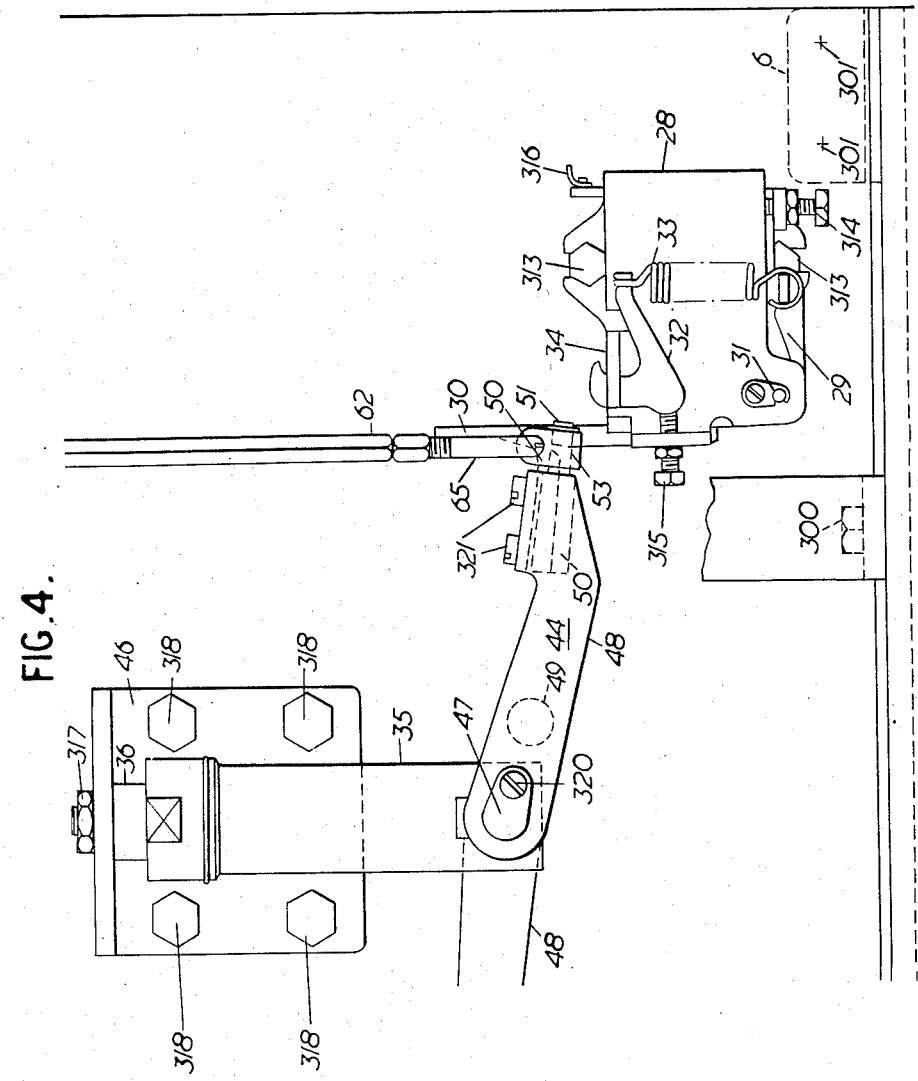

The above mentioned lever 44 is a U-formed piece (FIG. 11) which is formed by the two arms 48, bridged at their end and secured together by means of the reinforcing round tie 49. The above mentioned extension 51 is welded on said bridge while the piece 50 is connected thereto with the help of the screws 321. The lever 44 is pivotally linked to said vertical housing 35 since the latter is provided on each side with a small hole in which a small axis 45 secured to a small plate 47 is able to fit, the latter plates 47 being secured to the arms 48 by means of the screws 320. Friction of the longer arm 48, extending on the left side of 35, against the vertical plate 2 is prevented by an intermediate mica block 54 which is fixed on the vertical mounting plate 2 with the help of the screws 322 (FIG. 3). The outermost left elbow-shaped part of arm 48 is provided with a ring member 60 connected thereto by the rivet 323, the end of a hook 63 mounted at the bottom end of arm 61 being engaged in said ring member. The elbow itself is provided with a small axis 58 around which a small cam follower 57 is freely and rotatably mounted.

Supports 67 and 68 are fixed on plate 2 by nuts 324 and are each provided with two openings: 69 and 70, for carrying axis 71' which is kept in its position by nuts 325 and around which hollow rod 71 can turn; and 72 and 73 (FIGS. 5 and 6) for enabling the insertion of said axis 71'. Hollow rod 71 carries the two analogous arms 74, one on each side, as well as arm 75. The former arms 74 cooperate with vertical reciprocating parts 77 which are able to slide in vertical slots 78, while the latter arm 75 is provided with a ring 79 (FIG. 2) which is riveted with rivet 326 and in which hook 66, terminating vertical arm 62 at its upper end, is engaged, moreover one arm 74 is connected to pin 120 mounted on support 68 by spring 121 (FIGS. 2 and 7).

The above mentioned vertical slots 78 are constituted by the two vertical guiding members 112 and the vertical part of a bracket 113, all three recessed as shown in FIG. 12. This slot and the reciprocating part have essentially a T-shaped cross-section so that, as shown in FIG. 5, only the lateral extensions of the cross-section of the reciprocating part fit into part 112, the friction being further reduced by the thin vertical strips 111, wedged between 112 and 2, against which only part of the reciprocating parts are able to slide.

The ends of arms 74 cooperating with the vertical reciprocating part 77 are able to vertically slide into slots provided in the vertical plate 2 and to be engaged in openings provided in the reciprocating parts to displace them.

Support 52 (FIGS. 1, 7 and 16) is secured to plate 2 with nuts 327 and on its upper part an axis 56 is fixed, around which a cap 59 is rotatable together with two integral lever arms 80 and 81 which carry at their end, small axes 82 and 83 respectively. On the former, a ring 84 is fixed in which hook 64, terminating vertical arm 61 at its upper end, is engaged, and around the latter a small roller 85 is freely rotatable.

The analogous brackets 92 (FIGS. 5, 6, 12, 13) are fixedly mounted on the vertical plate 2 with screws 328, (FIGS. 1, 2, 5 and 6) while two analogous plates 93 (FIG. 12) are secured thereto with screws 329 (FIGS. 12, 13). In openings provided in these pieces 93 a rod 94' (FIGS. 5, 6) is fixed with screws 330; and around this bar a hollow axis 94, which is composed of two parts 95 and 96 (FIGS. 12, 13) is able to turn.

Part 95 (FIGS. 14 and 15) is supported at its inner end by support 97, which is connected with plate 2 by means of screws 331, the piece 97' being connected to 97 with screws 331'. It is provided at that end with an arm 102 which leans, in the rest position shown on FIG. 14, against an upturned end 103, part of arm 109.

Part 96 is not supported at its inner end since the support 97 is adaquate as parts 95 and 96 surround the common through axis 94'. It is provided however at its inner end by an arm 104 similar to 102 and also leaning in the rest position against the upturned end 103. Hollow axis 96 is moreover surrounded by a collar 105 which may turn freely about it but is prevented from slipping along its axis by ring 327 fixed to axis 96.

Collar 105 is integral with a T-shaped level comprising an upper branch 91 extending on both sides of axis 96 and a branch 109 substantially parallel to 102 and 104. At one end of lever branch 91 a pin 106 is tied to another pin 108, secured to plate 2 with screw and nut 328, by means of a spring 107. At the other end of lever branch 91, a pin 89 is used as pivot for another lever 87 which has an upturned end 86 on one side of the pivot. This end 86 may be acted upon by roller 85 previously mentioned and in a manner, to be described later. The opposite end of lever 87 is made to bear against an upturned horizontal part 90 of the lever branch 91 by means of a spring 88. On the other hand, the lower lever branch 109 has a vertical upturned end 103, supporting 102 and 104 as previously mentioned, and bearing against a small cylindrical stop member 110 fixed to vertical plate 2 by screws 337.

Hollow half-rods 95 and 96 are controlled in an identical manner at their outer ends (FIGS. 12 and 13). Referring to rod 96 it is made integral with two armed lever 98 to the upper short part of which a pin 99 is connected, tied by spring 100 to fixed pin 101 secured to bracket 92 by nut 338.

Two downward inclined analogous forked guides 115 (FIG. 12) are secured to the above mentioned brackets 92 with the help of screws such as 335 (FIG. 12), and between the forks of each of said guides a conveyor chain 600 part of a transverse conveyor (FIGS. 19 and 21) may be displaced. The latter conveyor chains are slightly inclined upward in order to reduce the pressure upon each other of articles, of the type mentioned above, when advanced on said chains. A lateral slot 117 has been provided in the external side of said guides 115 such that a T-shaped pusher 116 may be displaced therein with the top part of the T perpendicular to the mounting plate 2. The transverse part of the latter pusher is connected to the lower forked end of arm 98 by means of the nut 333 (FIG. 12), the displacement of the arm 98 being limited by the length of the slot 117 provided in the bracket 92. On its lower part each guide is further provided with a hole perpendicular to the mounting plate 2 in which a finger 118 may be lodged. This finger is continuously pushed in the direction of the vertical mounting plate 2 by means of the spring 119 kept within said hole with the help of the screw 334 (FIG. 9).

A channel-member 124 (FIG. 8) is secured to the bottom part of the vertical mounting plate 2, to which also the mica plates 122 and 123 (FIGS. 7 and 8) are connected. Both form part of the edgewise conveyor since a document transferred from said transverse conveyor by the mechanism now described will be brought into said channel-member and displaced edgewise therein hereby resting with its flat surface against said mica plates.

Another part of said edgewise conveyor is constituted by a triangular unidirectional stop member 125 which is fixed on the free end of a leaf spring 126 (FIG. 3) which is secured on its other end to the vertical mounting plate (not shown). This is designed to prevent an eventual rebound of the document carrier once it has been shifted past said stop.

Electrical terminals 127 (FIGS. 5 and 6), which are fixed on the plate 2 with the screws 336, are constituted by a leaf spring 128 on the front side of the plate 2, that is provided at its end with a carbon pin 129 (FIGS. 1, 2), and by the two blades 130 and 131. When an article is lodged in the groove 132, it pushes this carbon pin against the blade 130 (behind plate 2) which thus comes into contact with the blade 131, connected in series with the electrical terminals 316 of the dropping electromagnet which therefore cannot operate when an article is not present, though said electromagnet may regularly be fed by cyclic operating pulses.

The transfer mechanism is realized such that the wheels 14, 17 and 18 continuously rotate around their respective shafts 10, 13 and 12, driven themselves by a not shown driving mechanism.

Principally referring to the FIGURES 1 to 18 and to the timing chart on FIG. 26, the transfer of a flat article, such as 602 (FIGS. 21 and 22) will now be described. With regard to FIG. 26 it is to be remarked that the dotted lines constitute the energisation time of the drop and shift electromagnets i.e. the time interval before their respective armatures are attracted. Initially or at other times, there is no article in the transfer position so that the contacts 127 are not closed and that the drop electromagnet 28 is not operated at the time $t_1$. Although the shift electromagnet will be operated it is without influence since there is no article in the transfer position. Lever arm 30 is in its outermost left position and during the motion of the cam follower 57 in the groove of camwheel 18, part 62 is kept in the position shown. However, all parts connected directly or indirectly with the elbow-shaped piece 48 will take part in said motion.

When the cam-follower 57 moves from the positions 400 to 401 during the space of time from $t_5$ to $t_{13}$, the cap 59 and the arms 80 and 81 pivot in the direction of arrow 500 (FIG. 9) and before position 401 is reached, the small roller 85 meets against the small plate 86 and pushes the arm 87 in the direction of arrow 501. Since the arm 87 makes contact with the small plate 90 of the arm 91, the latter pivots in the same direction. Arms 109, 102, and 104 (FIG. 14) move in the direction of arrow 502, as the last two arms are both leaning against small plate 103 of arm 109, while the spring 107 is stretched. Thus forked arms 98 (FIG. 9) also pivot in the same direction while springs 100 (FIG. 12) are stretched.

The articles moved forward on said upward inclined conveyor arrive at a certain moment on the downward inclined guides 115, slide thereon and fall with their lips on the pushers 116 (FIGS. 7–13). The arms 98 free grooves 132 by moving the pieces 116' in the same direction, away from plate 2, such that one or more eventually present articles are enable to fall with their lips in said grooves (FIG. 9). At a certain moment, even before cam follower 57 reaches position 401, the small roller 85 no longer makes contact with the plate 86 and the arm 87 is freed such that the above mentioned arms 102, 104, 109 and 98 pivot in the direction of arrow 504 (FIGS. 9 and 14) under the influence of the restoring distending springs 107 and 100. The arm 109 is restored to its rest position while the other arms pivot into a position, fixed by the number of lips fallen in each groove 132, wherein the pushers 116 push against these lips so as to close the electrical contacts 127. The number of lips may be different in the left and right groove but these lips will always be pressed against piece reciprocating part 77, since the axes 95 and 96 are independent from each other when moving in the direction of arrow 504.

During the displacement 401—402 of the cam-follower 57, all the pieces connected to it are maintained in the position they already reached at moment $t_{13}$.

When the cam-follower 57 moves from the position 402 to 403 during the time interval $t_{15}$ to $t_{22}$ the piece 61 moves upward and cap 59, arms 80 and 81 pivot in the direction of arrow 503 (FIG. 10). Thus the movement starts from the position shown in FIG. 10, except of course that the reciprocating parts did not move. At a certain moment the roller 85 now meets the underside of the piece 86 which is pushed upward and which pivots around axis 89 against the action of restoring spring 88, such that the piece 87 is disconnected from the plate 90, but only momentarily because it is immediately restored to its rest position, wherein it leans against said plate 90, under influence of spring 88. This motion has had no influence on the other parts of the mechanism, arm 81 has however been able to return to its previous position.

When the wheel 57 moves from position 403 to 400, passing through position 404, the different parts keep the position already reached at the moment $t_{22}$.

During the whole described motion of the cam-follower 57 in the profile of the camwheel 18, the movable cylinder of the spring arrangement 35 has been displaced vertically and in conformity with the movement of the arm 61.

A description will now be given of the operation of the mechanism when the dropping electro-magnet 28 is energized.

The contacts 127 being closed by the front article in a manner described above, the dropping electromagnet 28 will be operated at the moment $t_1$ of the operation cycle. The lever arm 30 thus pivoting in a clockwise direction frees the lever 44 and enables the movement of the arm 62. Both the arms 61 and 62 may now take part in the movement directed by the cam-follower 57. During this movement the movable housing 43 of the spring arrangement 35 will remain in its rest position, the lever 44 oscillating about the small pivots 45 inserted in the housing 43. The vertical arm 61 and all the parts connected to it have a motion as was already described in the foregoing pages and further articles are eventually brought in the grooves 132.

Part 62 directs the operation of all the pieces connected to it and as the cam-follower 57 moves from the positions 400 to 401 during the time interval from $t_5$ to $t_{13}$, the arms 62 and 74 move upward. The reciprocating parts 77 are now in a position shown on FIG. 10 such that the front article, which together with the following had its lateral extensions engaged on the inclined parts of members 115 and underneath the inclined web of parts 113, is able to fall in a position wherein it is only prevented from falling further by the finger 118. The position of these pieces is maintained during the motion 401—402 of cam-follower 57 within the time interval from $t_{13}$ to $t_{15}$. When the cam-follower 57 now moves from the position 402 to 403, the arms 62 and 74 are displaced downward, such that said reciprocating parts 77 will engage, the corresponding lateral extensions of the front article and push it downward, thus bringing it vertically on the channel-member 124, fixed on the lower part of the vertical plate 2.

When one or both lateral extensions of an article which has to be dropped have an unduly large thickness or when their surface has been accidentally distorted, which prevents them from falling on the outer end of the fingers 118 at the moment the reciprocating parts are moved upwardly, the reciprocating mechanism may be blocked.

Indeed, when the latter reciprocating parts move in a downward direction they will try to push the corresponding lateral extension in the gap existing between the vertical front plate and the guide 115. Due to the thickness of said extensions this will however be impossible and the corresponding reciprocating part will come to rest.

Since the downward displacement of the reciprocating parts is guided by the upward displacement from position 402 to 403 of the cam-follower 57 in the groove of the camwheel 18, this cam-follower will take a position intermediate between the positions 402 and 403. During the further motion of the cam-follower 57 towards the position 403, the position of the arm 62 being fixed, both the springs 38 and 39 of the spring-arrangement 35 (FIG. 11) will be compressed, thus allowing said upward movement of the cam-follower without difficulties. When the arm 62 moves downward during time interval $t_{15}$ to $t_{22}$, the piece 51 of the arm 44 locks itself in the hook extension of armature arm 30 of the electromagnet 28 which was already released since the moment $t_8$.

The height of each article is chosen such that when resting on the channel member 124 its lateral extensions are on the level of the small wheel 34. After said article has fallen on this channel-member the shifting electromagnet 24 is operated at the moment $t_3$ and the constantly rotating wheel 17 is pushed with its rubber outer periphery towards the wheel 34 such that the article is pressed between these wheels in order to be displaced in the direction of the arrow 505. Afterwards it is taken and pressed between the continuously rotating wheels 14 and 19 and further displaced in the same direction hereby pushing in the uni-directional stop member 125.

A modified embodiment of the invention is represented on the FIGS. 19–24 and all the parts which are identical with those shown on the FIGS. 1–18 of the first arrangement are indicated by the same numerals.

In the latter arrangement it has been described how an article is brought in a dropping position wherein it closes the contacts 127, thus preparing the operation of the dropping electromagnet, which is then energized at a further moment $t_1$.

As mentioned above, with regard to the spring arrangement, it may however happen that one or even both extensions of an article, which has to be dropped are prevented from falling on the fingers 118 when the reciprocating parts are moved upwardly e.g. due to an unduly large thickness of the extensions or when their surface has been accidentally distorted.

Although the article is not able to be displaced, the shifting electromagnet will be operated and exert an undesirable pressure on the blocked article. It thus becomes clear that one must avoid, as much as possible, energizing the dropping electromagnet when the article, which has to be dropped, is not in a convenient position i.e. it is to be prevented, as much as possible, that both the above mentioned series connected contacts 127 are closed by a front article which is not in a convenient position.

The mechanism according to a modified embodiment reduces by 50% the eventual faults which may occur for the reasons mentioned above.

This is obtained by omitting the reciprocating mechanism on one side and replacing it by a suitable arrangement enabling that the lateral extension of the article which is not engaged to slide into the desired lower position against the front plate. Thus, the right-hand lateral extension, which corresponds to the front side of the article when the latter is carried away on its edge, will still be engaged while the left-hand extension will not.

Also, the left-hand contact 127 has now been replaced by a sensitive switch mounted a little bit above the level of the channel-member and under the left-hand part of the flat surface of a dropped article. In this manner this sensitive switch will only be closed when the left-hand part of the front article has fallen on the channel member. Upon the right-hand contact 127 being also closed the dropping electromagnet will be energized.

The hollow axis 96 is now constituted of only one part and carries the arms 98 (FIG. 21) and 102, (FIG. 20) the latter leaning against the upturned plate 103, part of arm 109. Part 603, which is fixed on mounting plate 2 by the help of the screws 604 constitutes a sloping guide replacing the left guide 115 of the foregoing arrangement. Its part nearer to said mounting plate is nearly horizontal and numbered 625. The mica strips 605 and 606 are secured to said plate 2 by means of screws 607, which also fix the parts 608 and 609; bracket 610 is fixed on the same plate with the screws 611.

Sensitive switch 612 which is mounted on plate 614 is fixed on the horizontal mounting plate 1 with the screws 615. It replaces the left hand contact 127 of the first embodiment of which the right hand contact 127 is maintained but not represented. Part 622 (FIG. 22) is a flexible upright piece that is fixed on the plate 1 with the screw 623, while the part 616, on which the two strips 617 are fixed with the screws such as 618, is mounted between the conveyor chains. It is inclined upward in the direction of motion of said chains, the latter being driven by the cogwheels 601. The distance between the vertical plate 2 and the center point of the left-hand cogwheel is greater than the distance between the same vertical plate and the center of the right-hand cogwheel. This was done for being able to obtain a lower slope for the inclined guide 603 as compared to the slope of guiding member 115.

The purpose of the inclined bottom plate 616 is twofold. First, as the articles 602 are advanced by the chains 600, their surface may not be truly perpendicular to the chains. Obviously, there is a limit to the allowable angle in order to avoid that the articles could slip between the two chains. Hence, at some distance from the vertical plate 2, it is already useful to straighten the position of the articles. This will be done upon the lowest part of the articles meeting the substantially vertical part 621 of the inclined bottom plate. Whichever side of the articles comes first, it will be somewhat delayed in climbing over the front part 621 so that by the time the lagging side meets that part 621, the surface of the article has become nearly perpendicular to the chains.

Second, after the bottom edge of the articles has been raised on the inclined plane 616, it will trail on the latter so that, while the long edges of the articles will be substantially perpendicular to the chains, their plane will be oblique with respect to the vertical, i.e. the upper edge leads the bottom edge. This lead will increase slightly as the articles are advanced since plate 616 has an upward slope. As the bottom edges of the articles reach the end of the inclined plate 616, the articles will then swing about their upper edges supported by the chains and they will be in this manner detached from the bulk of the following articles which are still trailing on the inclined plate 616. This decoupling action is useful in order that the front articles can be handled near the input of the reciprocating mechanism without being unduly influenced by the pressure of the whole bulk of the following articles.

The strips 617 have been added to already ensure some kind of separation between the lots of articles, as they are trailing on top of the inclined plate 616.

In the modified embodiment now described, it is desired to have the left-hand extension of the article sliding on the inclined guide 603 before the right-hand extension is allowed to slide on the more inclined guiding block 115. With this aim in view, it is desirable that as the left-hand extension slides down, the right-hand extension should be fixed, since if it is allowed to be displaced as well, on the right-hand chain, the left-hand extension moving faster on the downward slope, there would be difficulties in not exceeding the critical angle. Hence, before allowing the left-hand extension to swing about the right-hand one as it goes down the slope 603, means are provided to secure a well defined pivoting point for the right-hand extension.

If this pivot point for the right-hand extension is located at a larger distance from the vertical front plate 2 than the beginning of the downward slope 603, the right-hand extension may reach this pivot point before the left-hand extension is engaged on the downward slope as required, but this means that after the left-hand extension has travelled down the slope, it will be in a more oblique position than if it is possible to have the pivot point for the right-hand extension at a smaller distance from the vertical plate 2.

With such a desirable arrangement for the location of the pivot point for the right-hand extension, means are provided to ensure that when the right-hand extension reaches its pivot, the left-hand extension will not yet be engaged on the downward slope. This means that the articles must be forced to assume a position such that the right-hand extensions lead their left-hand extensions.

This is done by providing another pivot point or stop member, on the left-hand side, and constituted by the flexible upward piece 622 fixed to the bottom plate by a screw 623. As the long edges of the articles are more or less perpendicular to the chain, the left-hand bottom part of the article will be retained by stop member 622 while the right-hand extension will swing somewhat about this stop member as it continues to be advanced by the right-hand chain 600. This swing will continue until the left-hand bottom part of the article is able to ride over piece 622 by which time the right-hand extension will have gained a sufficient lead over the left-hand one, as required.

Thus, the right-hand extension will be arrested by the pivot point or stop member 624, which is located slightly above the upper inclined surface of guide 115, before the left-hand extension is engaged on the slope 603. Then, the articles will swing in the opposite direction, this time about the fixed pivot 624. In so doing, the left-hand extensions will reach the slope 603 and glide along the latter until they have travelled sufficiently down the slope 603 that their long edges are now oblique with respect to the horizontal whereby the outer tip of the right-hand extension is raised and the right-hand extension is now allowed to pass over stop member 624 which, as will be recalled, is located only slightly above the upper inclined surface of the guide 115. While the left-hand extension continues to travel down the slope 603, the right-hand extension will thus also glide along the upper slope of guide member 115.

This motion will be stopped upon the right-hand extension nearly reaching the vertical plate 2 and falling on top of the pusher 116 previously described. At the same time, the left-hand extension will reach part 625 which is still slightly inclined but nearly horizontal. As the level of part 625 is slightly lower than the level of the upper surface of this pusher, the upper edge of the article is slightly inclined with respect to the horizontal, rising towards the right. In this manner, the horizontal guard plate 608 which is located above part 625 by a distance slightly greater than the height of the extensions, will prevent the left-hand extension from entering the final part of the slope, i.e. part 625.

The external bracket 610 constitutes a further means to avoid pressure of the bulk of the following articles on the front ones. As the article slides along 603, it is at first still sliding against the inclined front end of the bracket 610, but it eventually slides underneath the horizontal part thereof. Sensitive switch 612 is operated as the article slides down the slope 603.

FIGS. 23 and 24 show a last additional step permitting to avoid difficulties in the reciprocating mechanism. This is constituted by an additional lever 619 pivoted inside member 115 about 620 fixed in the latter. The bottom end of lever arm 619 rests on the extension 116' of the pusher as shown in FIG. 23 so that the lug 621 on the upper end of this lever arm 619 is flush with the upper inclined surface of guiding member 115. In this way, the articles engaged on the upper inclined slope of member 115 are able to slide downward as before.

However, when a number of articles has been able to fill the groove 132, the pusher will be displaced away from the vertical plate 2 and in so doing, the extension 116' will cause a slight clockwise rotation of lever arm 619 so that the lug 621 protrudes out of the upper inclined surface of guide member 115 and prevents further articles from pressing against those already engaged in the groove 132.

With the front article having reached the position mentioned above, the right-hand extension acted upon by the pusher will close contact 127 still provided on the right-hand part, and as sensitive contact 612 has already been closed by the left-hand bottom part of the article, the two closed contacts in series will energize the dropping electromagnet 28. This will result in the right-hand extension of the article being engaged in the manner previously described. After this engaging action, the upper stage of the article will now be horizontal whereby the left-hand part of the article may now slide underneath the guard plate 608, and the article may be further dispatched sideways due to the operation of the shift electromagnet 24.

With the shifting electromagnet, mounted in a position as shown on the figures when pushing the shifting wheel against a dropped article, it may happen that the rear bottom end may have a tendency to be raised due to the exerted torque.

This may easily be prevented by placing the shifting wheel at the bottom of the front plate.

While the principles of the invention have been described above in connection with specific apparatus, it is to be clearly understood that this description is made only by way of example and not as a limitation on the scope of the invention.

We claim:
1. In the mechanism for transferring flat articles from a transverse conveyor to an edgewise conveyor located therebelow, a plurality of said flat articles and means for supporting said flat articles in upright position across said transverse conveyor, transfer means positioned in the path of said conveyed articles to feed said articles to said edgewise conveyor, said transfer means comprising guide means having a first end positioned adjacent said transverse conveyor and a second end positioned above said edgewise conveyor, means responsive to movement of said transverse conveyor for moving said articles to said first end of said guide means for movement along said guide means to said second end of said guide means, and reciprocating means for individually moving said articles from said second end of said guide means to said edgewise conveyor, wherein said guide means are downwardly inclined to cause articles moved to said first end of said guide means to slide to said second end thereof, holding means for preventing articles in said second position on said guide means from moving to said edgewise conveyor, and means controlled by said reciprocating means for disabling said holding means to permit said movement of an article to said edgewise conveyor.

2. In a mechanism for transferring flat articles from a transverse conveyor to an edgewise conveyor located therebelow, a plurality of said flat articles and means for supporting them in an upright position across said transverse conveyor, transfer means positioned in the path of said conveyed articles to feed the said articles to said edgewise conveyor, said transfer means comprising guide means having a first end positioned adjacent said transverse conveyor and a second end positioned above said edgewise conveyor, means responsive to movement of said transverse conveyor for moving said articles to the first end of the guide means for movement along said guide means to the second end of the guide means, reciprocating means slidably mounted for individually moving said articles from the second end of said guide means to said edgewise conveyor, said articles each including a pair of lateral-extending projections and said transverse conveyor and said guide means each including parallel portions for engaging said projections to support said articles, said reciprocating means including portions for engaging said lateral projections when said articles are moved to said second position and said reciprocating means is moved towards said guide means, said portions exerting a force on said projections to cause said movement of the articles from the guide means to the edgewise conveyor, and electromagnetic means operable responsive to said guide means supporting any said article in said first position for controlling one cycle of movement of said reciprocating means.

3. A mechanism as set forth in claim 1 wherein said reciprocating means is slidably movable towards and away from said guide means to define a first and a second position respectively on the second end of said guide means, and wherein a plurality of articles moved to said first end of said guide means slide to the first of said positions, pusher means responsive to movement of said reciprocating means for moving the foremost article of a group of articles in said first position to said second position, and means responsive to the said movement of said reciprocating means towards said guide means for causing the said movement of the foremost article to the edgewise conveyor.

4. A mechanism as claimed in claim 1 wherein said articles each include a pair of lateral-extending projections and wherein said transverse conveyor and said guide means each include parallel portions for engaging said projections to support said articles.

5. In a mechanism according to claim 4, said reciprocating means including portions for engaging said lateral projections when said articles are moved to said second position and said reciprocating means is moved towards said guide means, said portions exerting a force on said projections to cause said movement of the articles from the guide means to the edgewise conveyor.

References Cited in the file of this patent
UNITED STATES PATENTS

| | | |
|---|---|---|
| 2,081,944 | Lund | June 1, 1937 |
| 2,231,196 | Romyns | Feb. 11, 1941 |
| 2,258,618 | Larkin | Oct. 14, 1941 |
| 2,815,874 | Kowal | Dec. 10, 1957 |
| 2,858,007 | McCain | Oct. 28, 1958 |
| 2,905,309 | Makrides | Sept. 22, 1959 |